United States Patent
Zhu

(10) Patent No.: US 12,432,802 B2
(45) Date of Patent: Sep. 30, 2025

(54) ICON DISPLAY METHOD, STORAGE MEDIUM, AND ELECTRONIC TERMINAL

(71) Applicant: JRD COMMUNICATION (SHENZHEN) LTD., Guangdong (CN)

(72) Inventor: Yuejun Zhu, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 471 days.

(21) Appl. No.: 17/906,744

(22) PCT Filed: Apr. 24, 2020

(86) PCT No.: PCT/CN2020/086622
§ 371 (c)(1),
(2) Date: Sep. 19, 2022

(87) PCT Pub. No.: WO2021/184489
PCT Pub. Date: Sep. 23, 2021

(65) Prior Publication Data
US 2023/0142719 A1  May 11, 2023

(30) Foreign Application Priority Data
Mar. 20, 2020 (CN) .......................... 202010203396.5

(51) Int. Cl.
*H04W 76/15* (2018.01)
*H04W 48/16* (2009.01)
*H04W 76/30* (2018.01)

(52) U.S. Cl.
CPC ........... *H04W 76/15* (2018.02); *H04W 48/16* (2013.01); *H04W 76/30* (2018.02)

(58) Field of Classification Search
None
See application file for complete search history.

(56) References Cited

U.S. PATENT DOCUMENTS 10,834,774 B1 * 11/2020 Haberman ............ H04W 16/32
2017/0367139 A1 * 12/2017 Jang ...................... H04W 16/14
(Continued)

FOREIGN PATENT DOCUMENTS

CN        107948996 A     4/2018
CN        108156637 A     6/2018
(Continued)

OTHER PUBLICATIONS

Written Opinion of the International Search Authority in international application No. PCT/CN2020/086622, mailed on Dec. 25, 2020.
(Continued)

*Primary Examiner* — Clemence S Han
(74) *Attorney, Agent, or Firm* — PV IP PC; Wei Te Chung

(57) ABSTRACT

An icon display method for an electronic device is provided. The method includes: controlling the electronic terminal to display a 5G icon, after the electronic terminal establishes dual connections with an LTE network and an NR network; detecting whether the electronic terminal can currently access an NR secondary cell after a first preset time period is delayed, when an NR secondary cell accessed by the electronic terminal is released; and controlling the electronic terminal to continue to display the 5G icon if yes. A computer-readable storage medium and an electronic terminal are also provided.

17 Claims, 7 Drawing Sheets

(56) References Cited

U.S. PATENT DOCUMENTS

2019/0357089 A1    11/2019  Ianev et al.
2022/0078877 A1*    3/2022  Lee ..................... H04W 76/15
2022/0159569 A1*    5/2022  Yuan ..................... H04W 76/16

FOREIGN PATENT DOCUMENTS

| CN | 108366437 A  | 8/2018  |
|----|--------------|---------|
| CN | 110351741 A  | 10/2019 |
| CN | 110622575 A  | 12/2019 |
| CN | 110691392 A  | 1/2020  |
| CN | 110784897 A  | 2/2020  |
| CN | 110839106 A  | 2/2020  |
| CN | 110856209 A  | 2/2020  |
| WO | 2019236332 A1| 12/2019 |

OTHER PUBLICATIONS

International Search Report in International application No. PCT/CN2020/086622, mailed on Dec. 25, 2020.
1st Office Action issued in corresponding Chinese Patent Application No. 202010203396.5, dated Sep. 29, 2020, pp. 1-10.
Notification to Grant Patent Right for invention in corresponding Chinese Patent Application No. 202010203396.5, dated May 28, 2021, pp. 1-4.

* cited by examiner

1

ICON DISPLAY METHOD, STORAGE MEDIUM, AND ELECTRONIC TERMINAL

CROSS REFERENCE TO RELATED APPLICATIONS

This application is a US national phase application based upon an International Application No. PCT/CN2020/086622, filed on Apr. 24, 2020, which claims the priority of Chinese Patent Application No. 202010203396.5, entitled "ICON DISPLAY METHOD AND DEVICE, STORAGE MEDIUM, AND ELECTRONIC TERMINAL", filed on Mar. 20, 2020 in the China National Intellectual Property Administration (CNIPA), the contents of which are incorporated herein by reference in their entirety.

TECHNICAL FIELD

The present disclosure relates to a communication technology field, and more particularly to an icon display method, a storage medium, and an electronic terminal.

BACKGROUND ART 5G is a new generation of mobile communication technology. Two networking schemes including non-standalone networking (NSA) and standalone networking (SA) exist. There are obvious differences between the two networking schemes. The NSA is deployed on an existing 4G infrastructure, and some of its services and functions continue to rely on 4G networks. Advantages are that it can save a construction cost and achieve rapid coverage. In the NSA, 5G signals are transmitted by transforming 4G base stations. The early laying speed is fast and the cost is low. This can make 5G popular as soon as possible and let as many users as possible enjoy it. In the SA, independent base stations are required to be built, and thus time cost required to achieve large-scale coverage is relatively high. The SA has characteristics of higher speed and lower delay. In the process of developing to the SA in the future, the NSA definitely has a long transition period. Therefore, NSA networking is a first choice for most operators in the early stage of 5G network construction. That is, before total coverage of the SA, the NSA networking will exist in the existing networks for a long time and coexist with the SA network. This also means that the NSA/SA dual modes will be a mainstream trend in the industry.

Most of currently deployed 5G new radio (NR, new air interface) networks are NSA ebb networks and rely on mature long term evolution (LTE) network coverage. At the same time, they can play high throughput of gNB in EUTRA-NA dual-connection (ENDC). In order to distinguish them from the LTE networks, it is necessary to display a current network as a 5G network on a UI interface of a terminal when the terminal is connected to an ENDC network. However, when the terminal has no data transmission, an RRC connection of an LTE network is released. That is, the RRC connection of the LTE network becomes idle. This results in the release of NR, and the current network is displayed as a 4G network on the UI interface of the terminal. At this time, the terminal might still be within coverage of an NR secondary cell, but an icon on the terminal is changed frequently between the 4G network and the 5G network. This cannot truly reflect a network state in a position where the terminal is located. Accordingly, a user mistakenly believes that 5G signals of the terminal are unstable. Product quality and brand reputation of the terminal are affected to a certain extent.

Technical Problem

Embodiments of the present disclosure provide an icon display method, a storage medium, and an electronic terminal capable of truly reflecting, through an icon, a network state of a location of the electronic terminal.

Technical Solution

In a first aspect, an embodiment of the present disclosure provides an icon display method for an electronic device. The method includes:
  controlling the electronic terminal to display a 5G icon, after the electronic terminal establishes dual connections with an LTE network and an NR network;
  detecting whether the electronic terminal can currently access an NR secondary cell after a first preset time period is delayed, when an NR secondary cell accessed by the electronic terminal is released; and
  controlling the electronic terminal to continue to display the 5G icon if yes.

The detecting whether the electronic terminal can currently access the NR secondary cell specifically includes:
  detecting whether a current LTE primary cell supports the dual connections, when it is detected that an LTE primary cell where the electronic terminal is located is changed within the first preset time period;
  detecting, according to an RRC state of the current LTE primary cell, whether the electronic terminal can currently access the NR secondary cell if the dual connections are supported; and
  determining that the electronic terminal cannot currently access the NR secondary cell if the dual connections are not supported.

In some embodiments of the present disclosure, the detecting, according to the RRC state of the current LTE primary cell, whether the electronic terminal can currently access the NR secondary cell specifically includes:
  detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and
  detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

In some embodiments of the present disclosure, the detecting whether the electronic terminal can currently access the NR secondary cell specifically includes:
  detecting an RRC state of an LTE primary cell when it is detected that the LTE primary cell where the electronic terminal is located is not changed within the first preset time period;
  determining that the electronic terminal can currently access the NR secondary cell, when the RRC state of the LTE primary cell is in a connection state; and detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

In some embodiments of the present disclosure, the method further includes:

setting a bearer database, and updating, in real time, a bearer number in the bearer database according to a number of at least one type of at least one cell which is currently accessed by the electronic device; and setting a cell database, and update, in real time, cell information in the cell database according to at least one cell where the electronic terminal is currently located.

In some embodiments of the present disclosure, the method further includes:

controlling the electronic terminal to display a 4G icon, when it is determined that the electronic terminal cannot access the NR secondary cell.

In some embodiments of the present disclosure, the controlling the electronic terminal to continue to display the 5G icon specifically includes:

controlling the electronic terminal to display the 5G icon, when a frequency band of the NR secondary cell which the electronic terminal can currently access belongs to a Sub6 frequency band; and controlling the electronic terminal to display a 5G UWB icon, when the frequency band of the NR secondary cell which the electronic terminal can currently access belongs to a millimeter wave frequency band.

In a second aspect, an embodiment of the present disclosure further provides an icon display device for an electronic terminal. The device includes:

a control module configured to control the electronic terminal to display a 5G icon, after the electronic terminal establishes dual connections with an LTE network and an NR network;

a detection module configured to detect whether the electronic terminal can currently access an NR secondary cell after a first preset time period is delayed, when an NR secondary cell accessed by the electronic terminal is released; and a display module configured to control the electronic terminal to continue to display the 5G icon, when the electronic terminal can currently access the NR secondary cell.

In a third aspect, an embodiment of the present disclosure further provides a computer-readable storage medium. The storage medium stores a plurality of instructions. The instructions are loaded by a processor to perform steps of:

controlling the electronic terminal to display a 5G icon, after the electronic terminal establishes dual connections with an LTE network and an NR network;

detecting whether the electronic terminal can currently access an NR secondary cell after a first preset time period is delayed, when an NR secondary cell accessed by the electronic terminal is released; and controlling the electronic terminal to continue to display the 5G icon if yes.

In some embodiments of the present disclosure, when the processor performs the step of detecting whether the electronic terminal can currently access the NR secondary cell, the processor specifically performs steps of:

detecting whether a current LTE primary cell supports the dual connections, when it is detected that an LTE primary cell where the electronic terminal is located is changed within the first preset time period;

detecting, according to an RRC state of the current LTE primary cell, whether the electronic terminal can currently access the NR secondary cell if the dual connections are supported; and determining that the electronic terminal cannot currently access the NR secondary cell if the dual connections are not supported.

In some embodiments of the present disclosure, when the processor performs the step of detecting, according to the RRC state of the current LTE primary cell, whether the electronic terminal can currently access the NR secondary cell, the processor specifically performs steps of:

detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

In some embodiments of the present disclosure, when the processor performs the step of detecting whether the electronic terminal can currently access the NR secondary cell, the processor specifically performs steps of:

detecting an RRC state of an LTE primary cell when it is detected that the LTE primary cell where the electronic terminal is located is not changed within the first preset time period;

determining that the electronic terminal can currently access the NR secondary cell, when the RRC state of the LTE primary cell is in a connection state; and detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

In some embodiments of the present disclosure, the instructions are loaded by the processor to further perform steps of:

setting a bearer database, and updating, in real time, a bearer number in the bearer database according to a number of at least one type of at least one cell which is currently accessed by the electronic device; and setting a cell database, and update, in real time, cell information in the cell database according to at least one cell where the electronic terminal is currently located.

In some embodiments of the present disclosure, the instructions are loaded by the processor to further perform steps of:

controlling the electronic terminal to display a 4G icon, when it is determined that the electronic terminal cannot access the NR secondary cell.

In some embodiments of the present disclosure, when the processor performs the step of controlling the electronic terminal to continue to display the 5G icon, the processor specifically performs steps of:
controlling the electronic terminal to display the 5G icon, when a frequency band of the NR secondary cell which the electronic terminal can currently access belongs to a Sub6 frequency band; and
controlling the electronic terminal to display a 5G UWB icon, when the frequency band of the NR secondary cell which the electronic terminal can currently access belongs to a millimeter wave frequency band.

In a fourth aspect, an embodiment of the present disclosure further provides an electronic terminal including a processor and a memory. The processor is electrically connected to the memory. The memory is configured to store instructions and data. The processor is configured to perform steps of:
controlling the electronic terminal to display a 5G icon, after the electronic terminal establishes dual connections with an LTE network and an NR network;
detecting whether the electronic terminal can currently access an NR secondary cell after a first preset time period is delayed, when an NR secondary cell accessed by the electronic terminal is released; and
controlling the electronic terminal to continue to display the 5G icon if yes.

In some embodiments of the present disclosure, when the processor performs the step of detecting whether the electronic terminal can currently access the NR secondary cell, the processor specifically performs steps of:
detecting whether a current LTE primary cell supports the dual connections, when it is detected that an LTE primary cell where the electronic terminal is located is changed within the first preset time period;
detecting, according to an RRC state of the current LTE primary cell, whether the electronic terminal can currently access the NR secondary cell if the dual connections are supported; and
determining that the electronic terminal cannot currently access the NR secondary cell if the dual connections are not supported.

In some embodiments of the present disclosure, when the processor performs the step of detecting, according to the RRC state of the current LTE primary cell, whether the electronic terminal can currently access the NR secondary cell, the processor specifically performs steps of:
detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and
detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

In some embodiments of the present disclosure, when the processor performs the step of detecting whether the electronic terminal can currently access the NR secondary cell, the processor specifically performs steps of:
detecting an RRC state of an LTE primary cell when it is detected that the LTE primary cell where the electronic terminal is located is not changed within the first preset time period;
determining that the electronic terminal can currently access the NR secondary cell, when the RRC state of the LTE primary cell is in a connection state; and
detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

In some embodiments of the present disclosure, the instructions are loaded by the processor to further perform steps of:
setting a bearer database, and updating, in real time, a bearer number in the bearer database according to a number of at least one type of at least one cell which is currently accessed by the electronic device; and
setting a cell database, and update, in real time, cell information in the cell database according to at least one cell where the electronic terminal is currently located.

In some embodiments of the present disclosure, the instructions are loaded by the processor to further perform a step of:
controlling the electronic terminal to display a 4G icon, when it is determined that the electronic terminal cannot access the NR secondary cell.

In some embodiments of the present disclosure, when the processor performs the step of controlling the electronic terminal to continue to display the 5G icon, the processor specifically performs steps of:
controlling the electronic terminal to display the 5G icon, when a frequency band of the NR secondary cell which the electronic terminal can currently access belongs to a Sub6 frequency band; and
controlling the electronic terminal to display a 5G UWB icon, when the frequency band of the NR secondary cell which the electronic terminal can currently access belongs to a millimeter wave frequency band.

Advantageous Effects

In the icon display method, the storage medium, and the electronic terminal provided by the present disclosure, the electronic terminal is controlled to display the 5G icon after the electronic terminal establishes the dual connections. When the NR secondary cell is released, it is detected whether the electronic terminal can currently access the NR secondary cell after the delayed first preset time period. If yes, the electronic terminal is controlled to continue to display the 5G icon. As such, the icon can truly reflect a network state of a location of the electronic terminal to prevent a user from mistaking a signal of the electronic terminal to be unstable, and the user can enjoy real and reliable network experience.

BRIEF DESCRIPTION OF DRAWINGS

Technical solutions and the advantageous effects of the present disclosure are best understood from the following detailed description with reference to the accompanying figures and embodiments.

DETAILED DESCRIPTION OF EMBODIMENTS

The following clearly and completely describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

Figure 1:
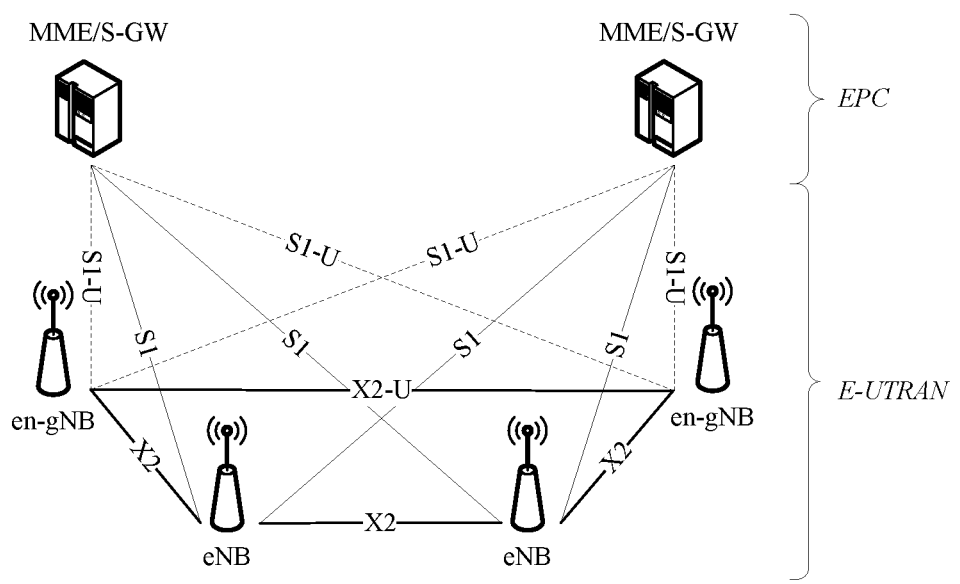
FIG. 1 illustrates an architecture diagram of an ENDC system provided by an embodiment of the present disclosure.

Please refer to FIG. 1. FIG. 1 illustrates an architecture diagram of an ENDC system provided by an embodiment of the present disclosure. The ENDC system includes an evolved packet core (EPC) network and an evolved UMTS terrestrial radio access network (E-UTRAN). The EPC includes a mobility management entity (MME) and a serving gateway (S-GW). The E-UTRAN includes evolved nodes B (eNBs, 4G base station) and en-gNBs (5G base station, also known as gNB). The eNBs are connected through an X2 interface. One eNB and one en-gNB are connected through an X2 interface. The en-gNBs are connected through an X2-U interface. One eNB and the EPC are connected through an S1 interface. One en-gNB and the EPC are connected through an S1-U interface.

In the ENDC system, the eNBs are master nodes (MNs), and the gNBs are secondary nodes (SNs). After a user equipment (UE) establishes a connection with the MN, a connection process between the UE and the SN is described as follows.

In 201, the MN sends a measurement control message to the UE.

The measurement control message includes measurement configuration and a measurement reporting event.

In 202, the UE sends a measurement complete message to the MN.

The UE receives the measurement control message, performs a measurement on an NR neighboring cell of an LTE network according to the measurement control message, and sends the measurement complete message to the MN after the measurement is completed.

In 203, the UE sends a measurement report to the MN.

When signal strength of at least one measured NR cell reaches signal strength determined in the measurement report event, the measurement report of the at least one NR cell is sent to the MN.

In 204, the MN sends an addition request to the SN.

The MN determines an optimal NR cell from the received measurement report of the at least one NR cell according to a preset rule and sends the addition request to an SN corresponding to the optimal NR cell. The addition request is used for requesting the SN as the SN of the UE, and the addition request carries information related to a connection with the MN.

In 205, the SN sends an addition request confirmation message to the MN.

In 206, the SN sends a radio resource control reconfiguration message to the MN.

In 207, the SN sends a bearer configuration message to the MN.

In 208, the MN sends a radio resource control reconfiguration and bearer configuration message to the UE.

After the MN receives the radio resource control reconfiguration message and the bearer configuration message sent by the SN, the MN packages the radio resource control reconfiguration message and the bearer configuration message together and sends the same to the UE.

In 209, the UE sends a configuration complete message to the MN.

The UE performs radio resource control reconfiguration and bearer configuration according to the radio resource control reconfiguration and bearer configuration message, and sends the configuration complete message to the MN after the radio resource control reconfiguration and the bearer configuration are completed.

In 210, the MN forwards the configuration complete message sent by the UE to the SN.

In 211, the SN sends a random access configuration message to the UE.

In 212, the UE sends a random access request to the SN.

After the UE receives the random access configuration message, the UE sends the random access request to the SN based on the random access configuration message.

In 213, the SN feeds back an access result to the UE.

The access result includes access success or access failure. For example, if the access result RACH Result= SUCCESS, it means that the access successes; otherwise, access fails.

When the access result is that the access is successful, an electronic terminal establishes connections with the MN and the SN to realize dual connections.

Figure 2:
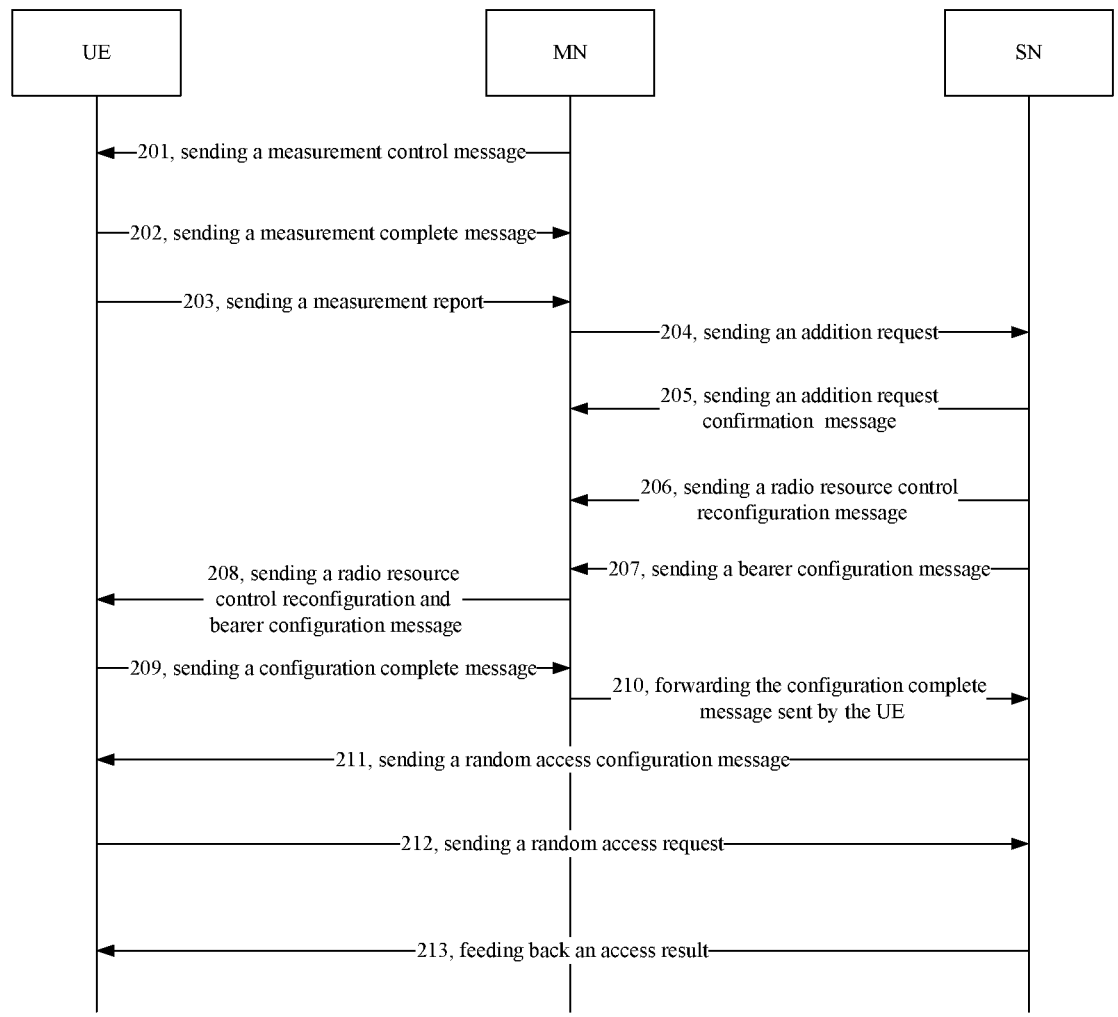
FIG. 2 illustrates a timing diagram of a connection between a UE and an SN provided by an embodiment of the present disclosure.
Figure 3:
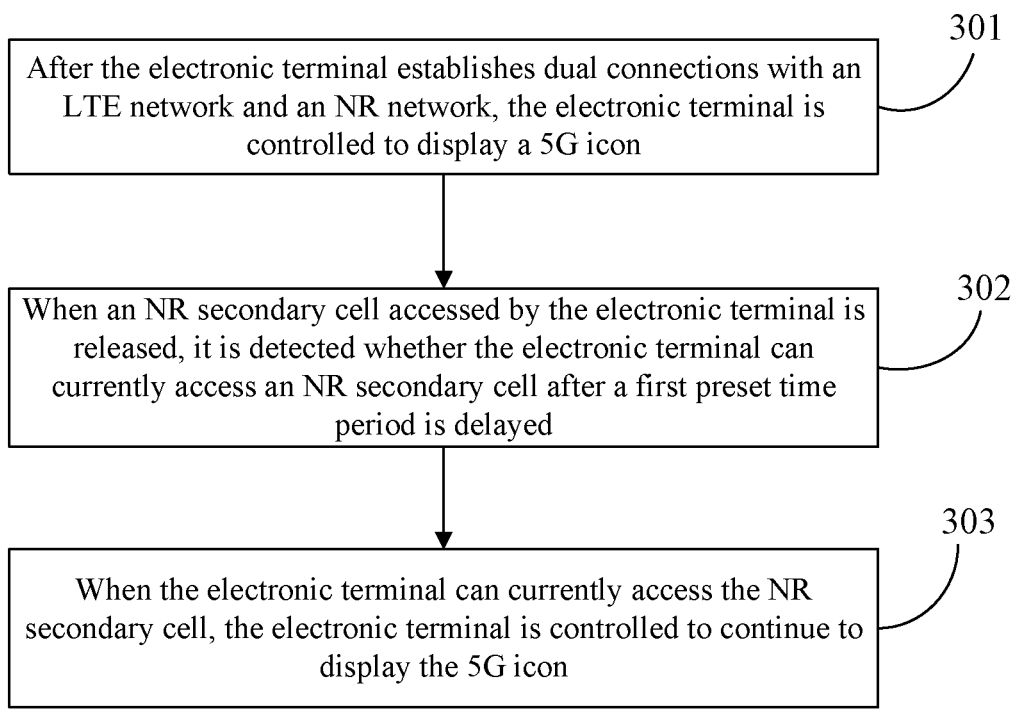
FIG. 3 illustrates a schematic flowchart of an icon display method provided by an embodiment of the present disclosure

As shown in FIG. 3. FIG. 3 illustrates a schematic flowchart of an icon display method provided by an embodiment of the present disclosure. The icon display method is for an electronic terminal. The electronic terminal can be the UE in FIG. 2. The icon display method can include steps 301 to 303.

In 301, after the electronic terminal establishes dual connections with an LTE network and an NR network, the electronic terminal is controlled to display a 5G icon.

In the embodiment of the present disclosure, after the electronic terminal establishes the dual connections, the electronic terminal accesses an LTE primary cell and an NR secondary cell. The LTE primary cell belongs to a master cell group (MCG), that is, a serving cell controlled by an MN. The NR secondary cell belongs to an SCG, that is, a serving cell controlled by an SN. After the electronic terminal establishes the dual connections, data plane radio bearers of the electronic terminal are simultaneously served by the MN and the SN. In the ENDC system, the MN is an eNB, and the SN is a gNB. In order to indicate that the electronic terminal accesses the NR secondary cell, after the electronic terminal establishes the dual connections, the electronic terminal is controlled to display the 5G icon.

In 302, when an NR secondary cell accessed by the electronic terminal is released, it is detected whether the electronic terminal can currently access an NR secondary cell after a first preset time period is delayed.

In the embodiment of the present disclosure, after the electronic terminal establishes the dual connections, the NR secondary cell accessed by the electronic terminal is released (that is, the SN connection is released) if the network is abnormal or the electronic terminal has no data transmission. Furthermore, the specification TS 38.331 5.7.3.3 defines 6 types of SCG failure. When one of these 6 situations occurs in the electronic terminal, the MCG issues radio resource control (RRC) reconfiguration to release the SCG. When the RRC is successfully re-built, it is re-determined whether to add an SCG according to a situation of at least one neighboring cell. The SCG release caused by an MCG cell handover includes the following situations: (1) an MN handover accompanied by the SN being changed; (1) an MN handover accompanied by the SN being unchanged; (1) an MN handover accompanied by the SN being modified; (1) an MN handover accompanied by an SN being added; and (1) an MN handover accompanied by the SN being released.

Figure 4:
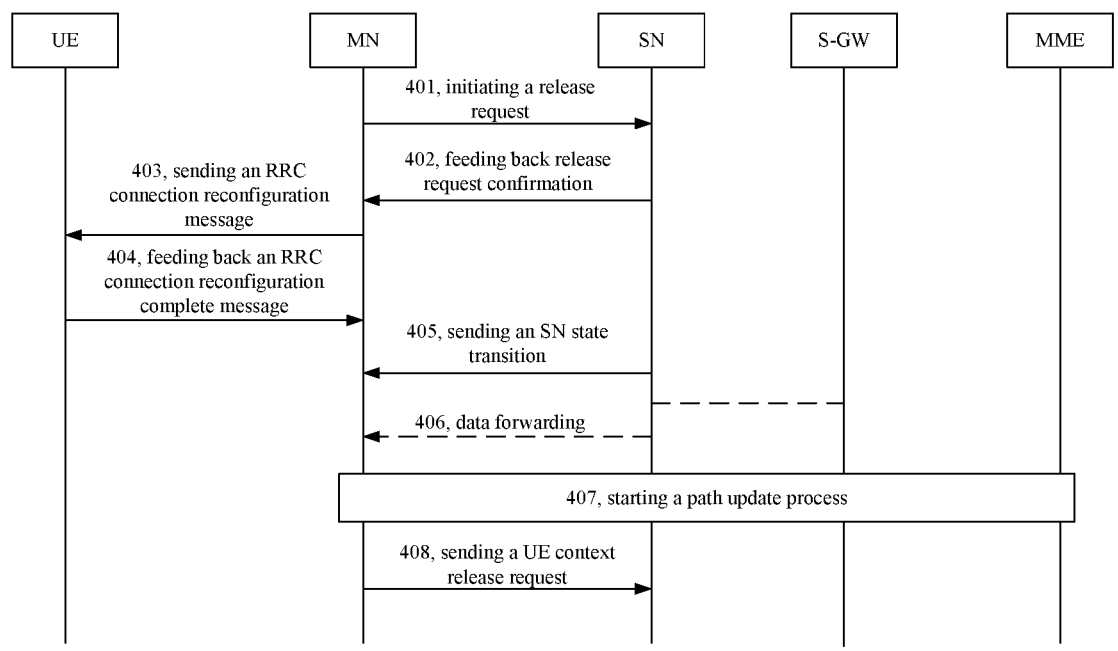
FIG. 4 illustrates a timing diagram of releasing an SN initiated by an MN provided by an embodiment of the present disclosure.

The release of the SN can be initiated by the MN or can be initiated by the SN. Specifically, as shown in FIG. 4, a process of releasing the SN initiated by the MN can be described as follows.

In 401, the MN initiates a release request to the SN.

In 402, the SN feeds back release request confirmation to the MN.

In 403, the MN sends an RRC connection reconfiguration message to the UE (electronic terminal).

In 404, the UE feeds back an RRC connection reconfiguration complete message to the MN.

In 405, the SN sends an SN state transition to the MN.

In 406, data forwarding from the SN to the MN occurs.

In 407, a path update process is started.

In 408, the MN sends a UE context release request to the SN.

After the SN releases UE context based on the UE context release request, the release of the SN, that is, the release of the NR secondary cell can be realized.

Figure 5:
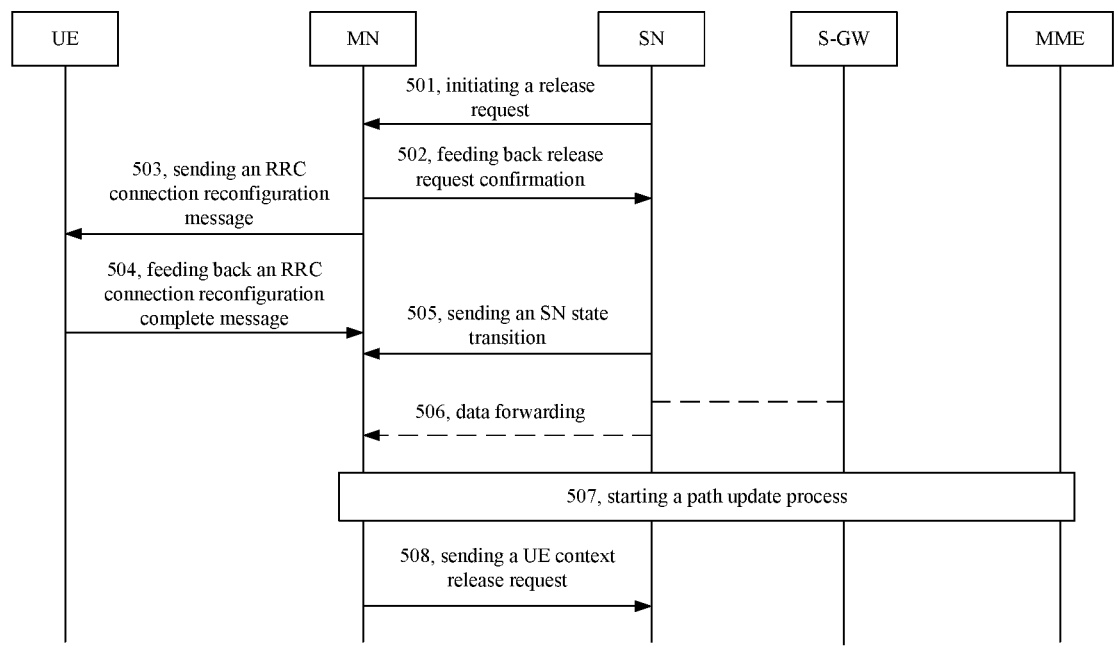
FIG. 5 illustrates a timing diagram of releasing an SN initiated by the SN provided by an embodiment of the present disclosure.

As shown in FIG. 5, a process of releasing the SN initiated by the SN can be described as follows.

In 501, the SN initiates a release request to the MN.

In 502, the MN feeds back release confirmation to the SN.

In 503, the MN sends an RRC connection reconfiguration message to the UE (electronic terminal).

In 504, the UE feeds back an RRC connection reconfiguration complete message to the MN.

In 505, the SN sends an SN state transition to the MN.

In 506, data forwarding from the SN to the MN occurs.

In 507, a path update process is started.

In 508, the MN sends a UE context release request to the SN.

After the SN releases UE context based on the UE context release request, the release of the SN, that is, the release of the NR secondary cell can be realized.

After the NR secondary cell is released, a timer T1 is started to delay for the first preset time period (a default is 2 seconds and can be customized), and the electronic terminal is control to continue to display the 5G icon within the delayed first preset time. It should be noted that in some situations, a new NR secondary cell is re-added after the network releases the NR secondary cell. Accordingly, a certain time (that is, the first preset time period) is reserved for the electronic terminal to re-connect an NR secondary cell to avoid jumping of the icons displayed on the electronic terminal (such as frequent changes between a 4G icon and a 5G icon) and improve user experience.

When the timer T1 times out (that is, after the first preset time is delayed), a signal icon displayed on the electronic terminal can be determined by detecting whether the electronic terminal can currently access an NR secondary cell (that is, detecting whether the electronic terminal is currently located within coverage of an NR secondary cell).

Specifically, the detecting whether the electronic terminal can currently access the NR secondary cell includes:

detecting whether a current LTE primary cell supports the dual connections, when it is detected that an LTE primary cell where the electronic terminal is located is changed within the first preset time period;

detecting, according to an RRC state of the current LTE primary cell, whether the electronic terminal can currently access the NR secondary cell if the dual connections are supported; and determining that the electronic terminal cannot currently access the NR secondary cell if the dual connections are not supported.

It should be noted that within the delayed first preset duration, it is detected whether the LTE primary cell where the electronic terminal is located is changed. This detection can be implemented through a flag bit "flag" in a preset cell database Cell_db. In the electronic terminal, the cell database Cell_db is preset, and the flag bit "flag" is set in the cell database Cell_db. That is, the cell database Cell_db records, in real time, information of the LTE primary cell where the electronic terminal is located. When the NR secondary cell accessed by the electronic terminal is released, "flag" is updated to 0. When the information of the LTE primary cell in the cell database Cell_db is not changed within the first preset time period, "flag" remains 0. When the information of the LTE primary cell in the cell database Cell_db is changed within the first preset time period, "flag" is updated to 1. Accordingly, when the electronic terminal detects that "flag" in the cell database Cell_db is 1, it is determined that the LTE primary cell where the electronic terminal is located is changed within the first preset time period. When it is detected that "flag" in the cell database Cell_db is 0, it is determined that the LTE primary cell where the terminal is located is not changed within the first preset time period.

When the LTE primary cell where the electronic terminal is located is changed within the first preset time period, the electronic terminal needs to detect whether the current LTE primary cell (that is, the LTE primary cell where the electronic terminal is currently located) supports the dual connection. This detection can be implemented by identifying a received system message. When upperLayerIndication in the system message is true, it indicates that the current LTE primary cell supports the dual connections. When upper- LayerIndication in the system message is false, it indicates that the current LTE primary cell does not support the dual connections. When the current LTE primary cell does not support the dual connections, the electronic terminal cannot currently access the NR secondary cell. When the current LTE primary cell supports the dual connections, it is necessary to further detect whether the electronic terminal can access the NR secondary cell according to the RRC state of the current LTE primary cell.

Specifically, the detecting, according to the RRC state of the current LTE primary cell, whether the electronic terminal can currently access the NR secondary cell includes:

detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

It should be noted that when the LTE primary cell where the electronic terminal is located is changed within the first preset time period, the current LTE primary cell supports the dual connections, and the RRC state of the current LTE primary cell is in the connection state, a timer T2 is started. That is, the second preset time period is delayed (a default is 3 seconds and can be customized). The electronic terminal is controlled to continue to display the 5G icon within the delayed second preset time period. Herein, the delayed second preset time period is to reserve a certain time for the electronic terminal to enable the electronic terminal to access a new NR secondary cell after the LTE primary cell is switched.

After the second preset time period is delayed, it is detected whether the electronic terminal accesses the NR secondary cell. This detection can be implemented by acquiring a bearer number drb in a preset bearer database drb_db. In the electronic terminal, the bearer database drb_db can be preset, and a field num is stored in the bearer database drb_db for recording, in real time, the bearer number drb in the bearer database drb_db. The electronic terminal updates, in real time, the bearer number drb in the bearer database drb_db according to a number of at least one type of at least one cell which is currently accessed. That is, when the electronic terminal accesses the LTE primary cell and the NR secondary cell, the electronic terminal currently has an MCG bearer and an SCG bearer. An ID of the LTE primary cell and an ID of the NR secondary cell are stored in the bearer database drb_db, and the bearer number drb in the bearer database drb_db is updated to 2. When the electronic terminal only accesses the LTE primary cell (that is, the NR secondary cell is released), the electronic terminal currently only has the MCG bearer. The ID of the NR secondary cell in the bearer database drb_db is deleted, and the bearer number drb in the bearer database drb_db is updated to 1. Specifically, when the LTE primary cell where the electronic terminal is currently located is changed, a filed drb-ToAddModList in an RRC connection reconfiguration message is read. When drb-identity contained in the field is inconsistent with the ID of the LTE primary cell in the bearer database drb_db, the ID of the LTE primary cell in the bearer database drb_db is updated to drb-identity. When the NR secondary cell is released, a field drb-ToRelelaseList in the RRC connection reconfiguration message is read. When drb-identity contained in the field is consistent with the ID of the NR secondary cell in the bearer database drb_db, the ID of the NR secondary cell in the bearer database drb_db is deleted.

Accordingly, when it is detected that the bearer number drb in the bearer database drb_db is 2, it is determined that the electronic terminal can currently access and has accessed the NR secondary cell. When it is detected that the bearer number drb in the bearer database drb_db is one other value (such as 1), it is determined that the electronic terminal cannot access the NR secondary cell.

When the LTE primary cell where the electronic terminal is located is changed within the first preset time period, the current LTE primary cell supports the dual connections, and the RRC state of the current LTE primary cell is in the idle state, a timer T3 is started. That is, the third preset time period is set (a default is 10 seconds and can be customized).

Within the third preset time period, the network re-sends measurement and control information. When the received measurement and control information includes information of the NR secondary cell, the information of the NR secondary cell is cached. The information of the NR secondary cell includes information of frequency/PCI (physical cell identification)/b1-ThresholdNR nr-RSRP (signal quality threshold)/hysteresis (offset) and other information. Furthermore, the electronic terminal starts an NR neighbor cell measurement after receiving the measurement and control information. When there is an NR secondary cell in the cached NR secondary cell information whose signal quality is greater than a signal quality threshold+an offset which are specified by the network (that is, rsrpResult of the NR secondary cell>b1-ThresholdNR nr-RSRP+hysteresis), it is determined that the current LTE primary cell has an NR neighbor cell which meets a preset condition. The timer T3 is stopped, and it is determined that the electronic terminal can currently access the NR secondary cell. Otherwise, after the timer T3 times out, it is determined that the electronic terminal cannot currently access the NR secondary cell.

When it is detected that the LTE primary cell where the electronic terminal is located is not changed within the first preset time period, the detecting whether the electronic terminal can currently access the NR secondary cell further includes:

detecting an RRC state of the LTE primary cell;

determining that the electronic terminal can currently access the NR secondary cell, when the RRC state of the LTE primary cell is in a connection state; and detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

It should be noted that when the LTE primary cell where the electronic terminal is located is not changed within the first preset time period and the RRC state of the LTE primary cell is in the connection state, it indicates that the electronic terminal can still access the original NR secondary cell and it is determined that the electronic terminal can currently access the NR secondary cell.

When the LTE primary cell where the electronic terminal is located is not changed within the first preset time period and the RRC state of the LTE primary cell is in the idle state, a situation that electronic The LTE primary cell where the terminal is located is not changed but the electronic terminal is no longer within coverage of the NR secondary cell might occur since the coverage of the NR secondary cell is smaller than coverage of the LTE primary cell. Accordingly, it is necessary to further detect whether the electronic terminal is currently within the coverage of the NR secondary cell. This detection can be implemented through the cell information stored in the cell database Cell_db. The electronic terminal updates, in real time, the cell information in the cell database Cell_db according to at least one current cell. That is, when the electronic terminal is located within the coverage of the LTE primary cell and is located within the coverage of the NR secondary cell, the information of the LTE primary cell and the information of the NR secondary cell are stored in the cell database Cell_db. When the electronic terminal is located within the coverage of the LTE primary cell and is located outside the coverage of the NR secondary cell, the information of the NR secondary cell stored in the cell database Cell_db is deleted and only the information of the LTE primary cell remains.

Specifically, when the LTE primary cell where the electronic terminal is located is not changed, the cell database Cell_db does not need to be updated. When the LTE primary cell where the electronic terminal is located is changed, the current LTE primary cell supports the dual connections, and the electronic terminal accessed the current LTE primary cell before (that is, the information of the current LTE primary cell is stored in the cell database Cell_db) but a corresponding NR secondary cell is different, the information of an old NR secondary cell in the cell database Cell_db is deleted after the electronic terminal accesses a new NR secondary cell and information of the new NR secondary cell is added. When the LTE primary cell where the electronic terminal is located is changed and the current LTE primary cell does not support the dual connection, all the same information of the LTE primary cell is deleted if the cell database Cell_db has the same information of the LTE primary cell, and the cell database Cell_db is not operated if the cell database Cell_db does not have the same information of the LTE primary cell.

Accordingly, when it is detected that the information of the LTE primary cell and the information of the NR secondary cell are stored in the cell database Cell_db, it indicates that the electronic terminal is located within the coverage of the LTE primary cell and the coverage of the NR secondary cell and it is determined that the electronic terminal can currently access the NR secondary cell. When it is detected that only the information of the LTE primary cell is stored in the cell database Cell_db, it indicates that the electronic terminal is located within the coverage of the LTE primary cell and outside the coverage of the NR secondary cell and it is determined that the electronic terminal cannot currently access the NR secondary cell.

In 303, when the electronic terminal can currently access the NR secondary cell, the electronic terminal is controlled to continue to display the 5G icon.

In the embodiment of the present disclosure, when it is determined that the electronic terminal can access the NR secondary cell after the first preset time period, the electronic terminal is controlled to continue to display the 5G icon. When it is determined that the electronic terminal cannot access the NR secondary cell after the first preset time period, the electronic terminal is controlled to display a 4G icon.

Specifically, the controlling the electronic terminal to continue to display the 5G icon includes:
  controlling the electronic terminal to display the 5G icon, when a frequency band of the NR secondary cell which the electronic terminal can currently access belongs to a Sub6 frequency band; and
  controlling the electronic terminal to display a 5G UWB icon, when the frequency band of the NR secondary cell which the electronic terminal can currently access belongs to a millimeter wave frequency band.

It should be noted that the Sub6 frequency band is ranged from 450 MHz to 6000 MHz, and the millimeter wave frequency band is ranged from 24250 MHz to 52600 MHz. When the electronic terminal can access NR secondary cells with different frequency bands, the electronic terminal is controlled to display different 5G icons to distinguish different types of 5G frequency bands.

It can be understood from the above that in the icon display method provided by the present disclosure, the electronic terminal is controlled to display the 5G icon after the electronic terminal establishes the dual connections. When the NR secondary cell is released, it is detected whether the electronic terminal can currently access the NR secondary cell after the delayed first preset time period. If yes, the electronic terminal is controlled to continue to display the 5G icon. As such, the icon can truly reflect a network state of a location of the electronic terminal to prevent a user from mistaking a signal of the electronic terminal to be unstable, and the user can enjoy real and reliable network experience.

Figure 6:
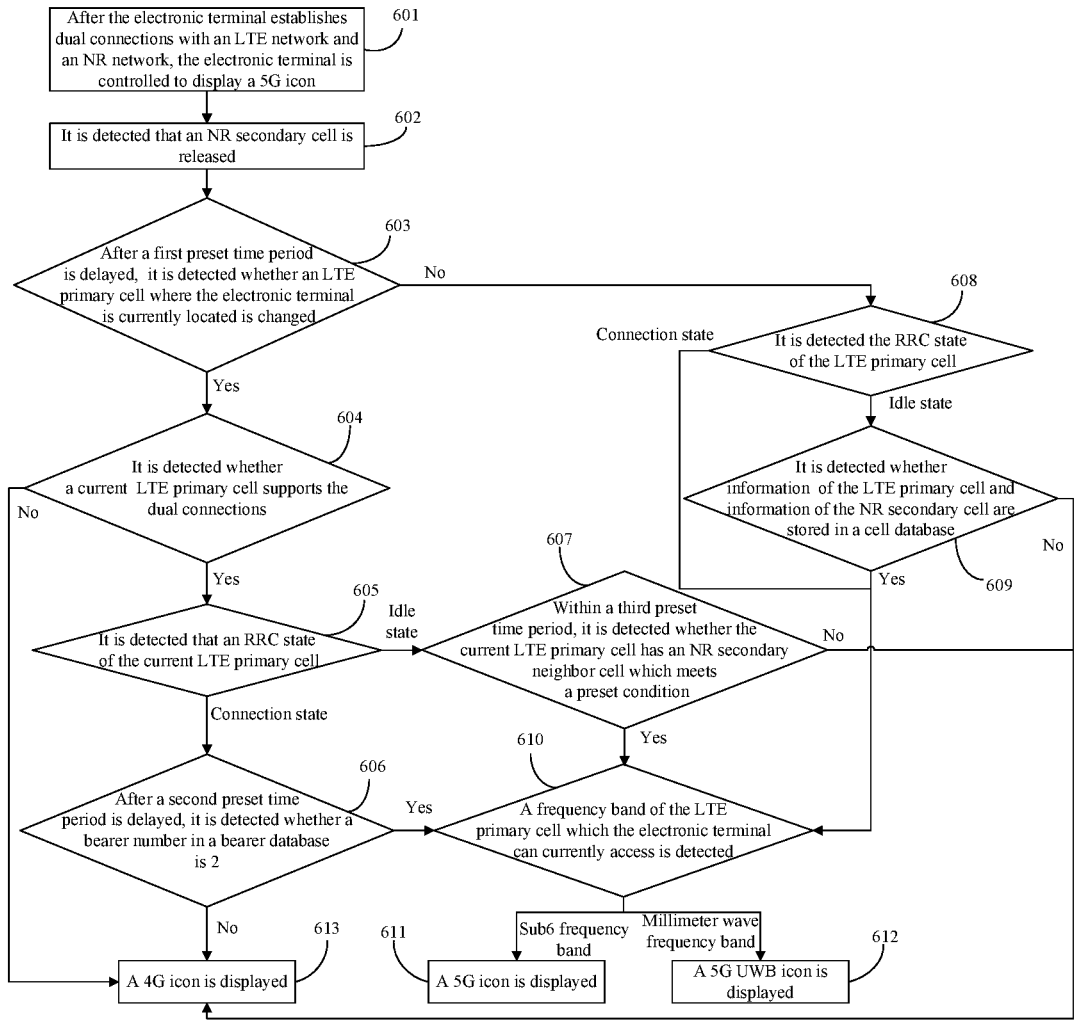
FIG. 6 illustrates a schematic flowchart of an icon display method provided by another embodiment of the present disclosure.

Please refer to FIG. 6. FIG. 6 illustrates a schematic flowchart of an icon display method provided by another embodiment of the present disclosure. The icon display method is for an electronic terminal. A specific process of the icon display method can be described as follows.

In 601, after the electronic terminal establishes dual connections with an LTE network and an NR network, the electronic terminal is controlled to display a 5G icon.

In 602, it is detected that an NR secondary cell is released.

In 603, after a first preset time period is delayed, it is detected whether an LTE primary cell where the electronic terminal is currently located is changed; if yes, step 604 is performed; and if no, step 608 is performed.

In 604, it is detected whether a current LTE primary cell supports the dual connections; if yes, step 605 is performed; and if no, step 613 is performed.

In 605, it is detected that an RRC state of the current LTE primary cell; when the RRC state is in a connection state, step 606 is performed; and when the RRC state is in an idle state, step 607 is performed.

In 606, after a second preset time period is delayed, it is detected whether a bearer number in a bearer database is 2; if yes, step 610 is performed; and if no, step 613 is performed.

In 607, within a third preset time period, it is detected whether the current LTE primary cell has an NR secondary neighbor cell which meets a preset condition; if yes, step 610 is performed; and if no, step 613 is performed.

In 608, it is detected the RRC state of the LTE primary cell; when the RRC state is in the connection state, step 610 is performed; and when the RRC state is in the idle state, step 609 is performed.

In 609, it is detected whether information of the LTE primary cell and information of the NR secondary cell are stored in a cell database; if yes, step 610 is performed; and if no, step 613 is performed.

In 610, a frequency band of the LTE primary cell which the electronic terminal can currently access is detected; when the frequency band belongs to a Sub6 frequency band, step 611 is performed; and when the frequency band belongs to a millimeter wave frequency band, step 612 is performed.

In 611, a 5G icon is displayed.

In 612, a 5G UWB icon is displayed.

In 613, a 4G icon is displayed.

In the present embodiment, the 5G icon is kept to be displayed when the electronic terminal is within coverage of the 5G cell, so as to accurately show 5G capability where the electronic terminal is located. Accordingly, a situation that the displayed icon is changed from 5G to 4G does not occur, when the network has a temporary abnormal condition of directly releasing a 4G RRC connection. This can enable a user to enjoy the 5G experience truly and reliably.

According to the methods described in the above-mentioned embodiments, the present embodiment will be further described from the perspective of an icon display device. The icon display device can be specifically implemented as an independent entity or can be integrated in an electronic device. The electronic device can include a mobile terminal, a wearable device, a PC terminal, a robot or the like. The electronic device can be connected to a network.

Figure 7:
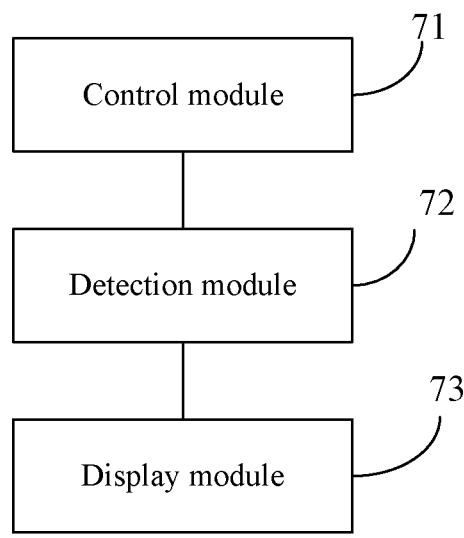
FIG. 7 illustrates an icon display device provided by an embodiment of the present disclosure.

Please refer to FIG. 7. FIG. 7 specifically illustrates an icon display device provided by an embodiment of the present disclosure. The icon display device can include: a control module 71, a detection module 72, and a display module 73.

The control module 71 is configured to control the electronic terminal to display a 5G icon, after the electronic terminal establishes dual connections with an LTE network and an NR network.

The detection module 72 is configured to detect whether the electronic terminal can currently access an NR secondary cell after a first preset time period is delayed, when an NR secondary cell accessed by the electronic terminal is released.

The display module 73 is configured to control the electronic terminal to continue to display the 5G icon, when the electronic terminal can currently access the NR secondary cell.

In some embodiments of the present disclosure, the detection module 72 is specifically configured to:
  detect whether a current LTE primary cell supports the dual connections, when it is detected that an LTE primary cell where the electronic terminal is located is changed within a first preset time period; and
  if yes, detect, according to an RRC state of the current LTE primary cell, whether the electronic terminal can currently access the NR secondary cell; and
  if no, determine that the electronic terminal cannot currently access the NR secondary cell.

In some embodiments of the present disclosure, the detection module 72 is further configured to:
  detect whether a bearer number in a preset bearer database is 2 after a second preset time period is delayed, when the RRC state of the current LTE primary cell is in a connection state; determine that the electronic terminal can currently access the NR secondary cell if yes; and determine that the electronic terminal cannot currently access the NR secondary cell if no; and
  detect, within a third preset time period, whether the current LTE primary cell has an NR neighbor cell which meets a preset condition, when the RRC state of the current LTE primary cell is in an idle state; determine that the electronic terminal can currently access the NR secondary cell if yes; and determine that the electronic terminal cannot currently access the NR secondary cell if no.

In some embodiments of the present disclosure, the detection module 72 is further configured to:
  detect an RRC state of the LTE primary cell, when it is detected that the LTE primary cell where the electronic terminal is located is not changed within the first preset time period;
  determine that the electronic terminal can currently access the NR secondary cell, when the RRC state of the LTE primary cell is in a connection state; and
  detect whether information of the LTE primary cell and information of the NR secondary cell are stored in a preset cell database, when the RRC state of the LTE primary cell is in an idle state; determine that the electronic terminal can currently access the NR secondary cell if yes; and determine that the electronic terminal cannot currently access the NR secondary cell if no.

In some embodiments of the present disclosure, the device further includes a setting module. The setting module is configured to:
  set the bearer database, and update, in real time, the bearer number in the bearer database according to a number of at least one type of at least one cell which is currently accessed by the electronic device; and
  set the cell database, and update, in real time, cell information in the cell database according to at least one cell where the electronic terminal is currently located.

In some embodiments of the present disclosure, the display module 73 is further configured to:
  control the electronic terminal to display a 4G icon, when it is determined that the electronic terminal cannot access the NR secondary cell after the first preset time period.

In some embodiments of the present disclosure, the display module 73 is further configured to:
  control the electronic terminal to display the 5G icon, when a frequency band of the NR secondary cell which the electronic terminal can currently access belongs to a Sub6 frequency band; and
  control the electronic terminal to display a 5G UWB icon, when the frequency band of the NR secondary cell which the electronic terminal can currently access belongs to a millimeter wave frequency band.

It can be understood from the above that the icon display device provided by the present disclosure can control the electronic terminal to display the 5G icon after the electronic terminal establishes the dual connections. When the NR secondary cell is released, it is detected whether the electronic terminal can currently access an NR secondary cell after a first preset time period is delayed. If yes, the electronic terminal is controlled to continue to display the 5G icon. As such, the icon can truly reflect a network state of a location of the electronic terminal to prevent a user from mistaking a signal of the electronic terminal to be unstable, and the user can enjoy real and reliable network experience.

Figure 8:
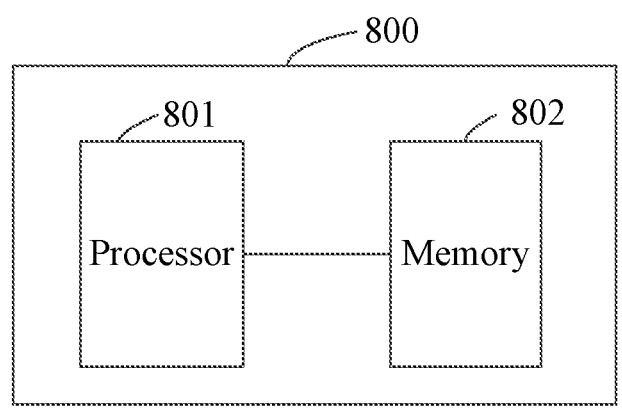
FIG. 8 illustrates a structural schematic diagram of an electronic terminal provided by an embodiment of the present disclosure.

Furthermore, an embodiment of the present disclosure further provides an electronic terminal. As shown in FIG. 8, the electronic terminal 800 includes a processor 801 and a memory 802. The processor 801 is electrically connected to the memory 802.

The processor 801 is a control center of the electronic terminal 800, is connected with all the parts of the whole electronic terminal by various interfaces and lines, and is configured to execute various functions of the electronic terminal and process the data by operating or loading application programs stored in the memory 802 and calling data stored in the memory 802, so as to carry out integral monitoring on the electronic terminal.

In the present embodiment, the processor 801 in the electronic terminal 800 loads instructions corresponding to processes of one or more application programs into the memory 802 according to the following steps, and the processor 801 executes the application programs stored in the memory 802 to implement various functions:

the electronic terminal is controlled to display a 5G icon, after the electronic terminal establishes dual connections with an LTE network and an NR network;

it is detected whether the electronic terminal can currently access an NR secondary cell after a first preset time period is delayed, when the NR network is released; and the electronic terminal is controlled to continue to display the 5G icon, if yes.

Figure 9:
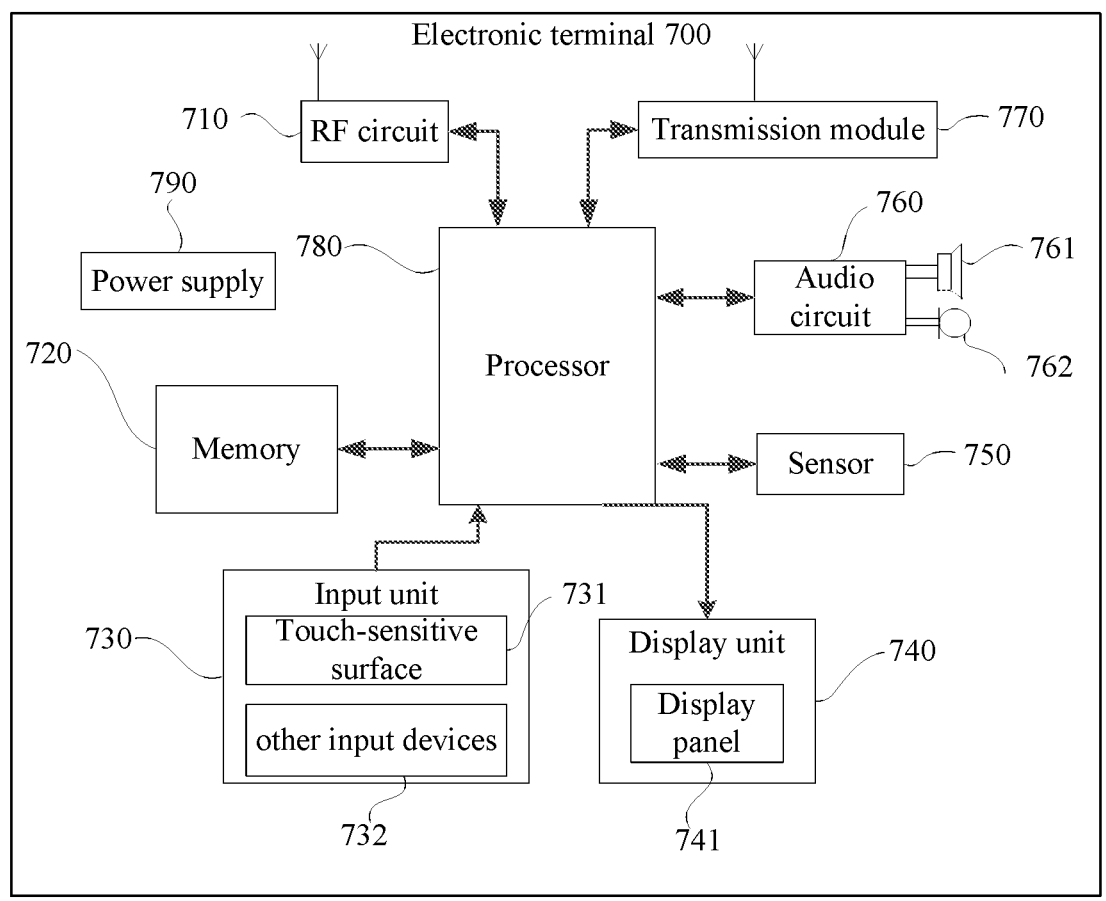
FIG. 9 illustrates a structural schematic diagram of an electronic terminal provided by another embodiment of the present disclosure.

Please refer to FIG. 9. FIG. 9 illustrates a structural schematic diagram of an electronic terminal provided by an embodiment of the present disclosure. The electronic terminal can be used for implementing the icon display method provided in any one of the above-mentioned embodiments. The electronic terminal can be connected to a network.

An RF circuit 710 is configured to receive and transmit electromagnetic waves and to realize conversions of the electromagnetic waves and electrical signals, thereby communicating with a communication network or any other device. The RF circuit 710 can include various conventional circuit elements used for performing these functions, for example, an antenna, a radio frequency transmitter, a digital signal processor, an encryption/decryption chip, a subscriber identification module (SIM) card, a memory and the like. The RF circuit 710 can communicate with various networks, for example, an internet, an intranet or a wireless network, or can communicate with any other device via a wireless network. The above-mentioned wireless network can include a cellular telephone network, a wireless local area network or a metropolitan area network. The above-mentioned wireless network can use various communication standards, protocols and technologies and can include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP), Worldwide Interoperability for Microwave Access (Wi-Max), other protocols for E-mail, instant messaging and Short Messaging Service and other suitable communication protocols, and can include protocols which are not developed currently.

A memory 720 can be configured to store software programs and modules, for example, the program instructions/modules in the above-mentioned embodiments. A processor 780 executes various functional applications and data processing by operating the software programs and the modules stored in the memory 720. The memory 720 can include a high speed random access memory and also can include a non-volatile memory, such as one or more disk storage devices, a flash memory device or other non-volatile solid storage devices. In some embodiments, the memory 720 can further include a remote memory disposed correspondingly to the processor 780. The remote memory can be connected to the electronic terminal 1200 via a network. Examples of the network include but are not limited to an internet, an intranet, a local area network, a mobile communication network and the combinations of them.

An input unit 730 can be configured to receive input number or character information and to generate keyboard, mouse, joystick, optical or trajectory ball signal inputs related to a user's setting and functional control. In detail, the input unit 730 can include a touch-sensitive surface 731 and other input devices 732. The touch-sensitive surface 731, also called a touch display screen or a touch panel, can be configured to detect touch operations of a user on or near the touch-sensitive surface 731 (for example, operations carried out by the user through any suitable objects or attachments, such as a finger, a touch pen and the like, on the touch-sensitive surface 731 or near the touch-sensitive surface 731) and to drive a corresponding device connected therewith according to a preset program. Optionally, the touch-sensitive surface 731 can include a touch detection device and a touch controller. The touch detection device detects the touch direction of the user, detects a signal caused by the touch operation, and transmits the signal to the touch controller. The touch controller receives touch information from the touch detection device, converts the touch information into a contact coordinate, and then transmits the contact coordinate to the processor 780 and can receive a command transmitted by the processor 780 and execute the command. Moreover, the touch-sensitive surface 731 can be one of various types, such as a resistance type, a capacitance type, an infrared type, a surface acoustic wave type and the like. Besides the touch-sensitive surface 731, the input unit 730 also can include the other input devices 732. In detail, other input devices 732 can include, but is not limited to, one or more of a physical keyboard, function keys (such as a volume control key, a switching key and the like), a trackball, a mouse, a joystick and the like.

A display unit 740 can be configured to display information input by the user or information provided for the user and various graphical user interfaces of the electronic terminal 700. The graphical user interfaces can be constituted by graphics, texts, icons, videos and any combinations of them. The display unit 740 can include a display panel 741. Optionally, the display panel 741 can be configured in forms of a Liquid Crystal Display (LCD), an Organic Light-Emitting Diode (OLED) and the like. Furthermore, the touch panel 731 can cover the display panel 741. When the touch-sensitive surface 731 detects a touch operation on or near it, the signal caused by the touch operation is transmitted to the processor 780 to determine the type of a touch event. Then, the processor 780 provides a corresponding visual output on the display panel 741 according to the type of the touch event. Although the touch-sensitive surface 731 and the display panel 741 in FIG. 9 are served as two independent parts for accomplishing input and output functions, it can be understood that the touch-sensitive surface 731 and the display panel 741 can be integrated to accomplish the input and output functions.

The electronic terminal 700 can further include at least one sensor 750, such as an optical sensor, a motion sensor and other sensors. In detail, the optical sensor can include an environmental light sensor and a proximity sensor. The environmental light sensor can adjust brightness of the display panel 741 according to the lightness of environmental light. The proximity sensor can generate an interruption when the electronic terminal 700 is flipped or closed or turned off. As one type of the motion sensor, an accelerometer sensor can detect the value of an acceleration in each direction (generally in three axial directions), can detect the value and the direction of gravity in a static state, which can be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors can be integrated into the electronic terminal 700, and explanations are not repeated herein.

An audio circuit 760, a speaker 761 and a microphone 762 can provide an audio interface between the user and the electronic terminal 700. The audio circuit 760 can transmit an electric signal obtained by converting received audio data to the speaker 761. The electric signal is converted into a sound signal to be outputted by the speaker 761. On the other hand, the microphone 762 converts a collected sound signal into an electric signal. The audio circuit 760 receives the electric signal and converts the electric signal into audio data. After the audio data is outputted to the processor 780 and is processed, it is transmitted, for example, to another terminal through the RF circuit 710, or is outputted to the memory 720 in order to be further processed. The audio circuit 760 can further include an ear plug hole for providing communication between an external ear phone and the electronic terminal 700.

The electronic terminal 700 can help the user to receive requests, send E-mails and the like by a transmission module 770 (for example, a Wi-Fi module). The transmission module 770 provides wireless broadband internet access for the user. Although the transmission module 770 is shown in FIG. 9, it should be understood that the transmission module 770 is not the necessary part of the electronic terminal 700 and can completely be omitted as required without changing the scope of essence of the present disclosure.

The processor 780 is a control center of the electronic terminal 700, is connected with all the parts of the whole electronic terminal by various interfaces and lines, and is configured to execute various functions of the electronic terminal 700 and process the data by operating or executing software programs and/or modules stored in the memory 720 and calling data stored in the memory 720, so as to carry out integral monitoring on the electronic terminal. Optionally, the processor 780 can include one or more processing cores. In some embodiments, the processor 780 can be integrated with an application processor and a modulation/demodulation processor. The application processor is mainly configured to process an operating system, at least one user interface, at least one application program and the like. The modulation/demodulation processor is mainly configured to process wireless communication. It can be understood that the modulation/demodulation processor can also be not integrated into the processor 780.

The electronic terminal 700 further includes a power supply 790 (such as a battery) for supplying power to each part. In some embodiments, the power supply can be logically connected with the processor 780 by a power supply management system, so as to implement functions of charge management, discharge management, power consumption management and the like by the power supply management system. The power supply 790 can further include one or more direct current or alternating current power supplies, recharging systems, power supply failure detection circuits, power converters or inverters, power supply status indicators and the like.

Although not shown in the FIG. 9, the electronic terminal 700 can further include a camera (for example, a front camera or a rear camera), a BLUETOOTH module, and the like which are not further described herein. In the present embodiment, the display unit of the electronic terminal is a touch screen display, and the electronic terminal further includes a memory and one or more programs. The one or more programs are stored in the memory and configured to be executed by one or more processors to perform instructions for executing the following operations contained in the one or more programs:

the electronic terminal is controlled to display a 5G icon, after the electronic terminal establishes dual connections with an LTE network and an NR network;

it is detected whether the electronic terminal can currently access an NR secondary cell after a first preset time period is delayed, when the NR network is released; and the electronic terminal is controlled to continue to display the 5G icon, if yes.

In specific implementations, the above-mentioned modules can be implemented as independent entities, and also can be combined in any combination and implemented as one or a plurality of entities. For the specific implementations of each module above, reference can be made to the above-mentioned method embodiments, and details are not further described herein.

Those skilled in the art can understand that all or some of the steps in various methods of the above-mentioned embodiments can be implemented through instructions or implemented through instructions controlling relevant hardware, and the instructions can be stored in a computer-readable storage medium and loaded and executed by a processor. To this end, an embodiment of the present disclosure provides a storage medium storing a plurality of instructions, and the instructions can be loaded by the processor, to perform the steps in the icon display method provided by any one of the embodiments of the present disclosure.

The storage medium can include: a read-only memory (ROM), a random access memory (RAM), a magnetic disk, an optical disc or the like.

Since the instructions stored in the storage medium can perform the steps of the icon display method provided by any one of the embodiments of the present disclosure, the instructions can implement advantageous effects which can be implemented by the icon display method provided by any one of the embodiments of the present disclosure. Details can be referred to the above-mentioned embodiments and are not described herein.

Specific implementations of each operation can be referred to the above-mentioned embodiments and are not described herein.

In summary, although the present disclosure discloses the above-mentioned preferred embodiments, the above-mentioned preferred embodiments are not intended to limit the present disclosure. Any modification, equivalent replacement, or improvement made by those skilled in the art without departing from the spirit and scope of the present disclosure should fall within the scope of the present disclosure. Therefore, the protection scope of the present disclosure is subject to the appended claims.

What is claimed is:

1. An icon display method, for an electronic device, the method comprising:
controlling the electronic terminal to display a 5G icon, after the electronic terminal establishes dual connections with a Long Term Evolution (LTE) network and a New Radio (NR) network;
detecting whether the electronic terminal can currently access an NR secondary cell after a first preset time period is delayed, when the NR secondary cell accessed by the electronic terminal is released; and controlling the electronic terminal to continue to display the 5G icon in response to that the electronic terminal can currently access the NR secondary cell;

wherein the detecting whether the electronic terminal can currently access the NR secondary cell specifically comprises:

detecting whether a current LTE primary cell supports the dual connections, when it is detected that an LTE primary cell where the electronic terminal is located is changed within the first preset time period;

detecting, according to a Radio Resource Control (RRC) state of the current LTE primary cell, whether the electronic terminal can currently access the NR secondary cell if the dual connections are supported; and determining that the electronic terminal cannot currently access the NR secondary cell if the dual connections are not supported.

2. The icon display method of claim 1, wherein the detecting, according to the RRC state of the current LTE primary cell, whether the electronic terminal can currently access the NR secondary cell comprises:

detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

3. The icon display method of claim 1, wherein the detecting whether the electronic terminal can currently access the NR secondary cell comprises:

detecting an RRC state of an LTE primary cell when it is detected that the LTE primary cell where the electronic terminal is located is not changed within the first preset time period;

determining that the electronic terminal can currently access the NR secondary cell, when the RRC state of the LTE primary cell is in a connection state; and detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

4. The icon display method of claim 1, further comprising:

setting a bearer database, and updating, in real time, a bearer number in the bearer database according to a number of at least one type of at least one cell which is currently accessed by the electronic device; and setting a cell database, and update, in real time, cell information in the cell database according to at least one cell where the electronic terminal is currently located.

5. The icon display method of claim 1, further comprising:

controlling the electronic terminal to display a 4G icon in response to that the electronic terminal cannot access the NR secondary cell.

6. The icon display method of claim 1, wherein the controlling the electronic terminal to continue to display the 5G icon comprises:

controlling the electronic terminal to display the 5G icon, when a frequency band of the NR secondary cell which the electronic terminal can currently access belongs to a Sub6 frequency band; and controlling the electronic terminal to display a 5G Ultra Wideband (UWB) icon, when the frequency band of the NR secondary cell which the electronic terminal can currently access belongs to a millimeter wave frequency band.

7. A non-transitory computer-readable storage medium, wherein the storage medium stores a plurality of instructions, and the instructions are loaded by a processor to perform steps of:

controlling the electronic terminal to display a 5G icon, after the electronic terminal establishes dual connections with a Long Term Evolution (LTE) network and a New Radio (NR) network;

detecting whether the electronic terminal can currently access an NR secondary cell after a first preset time period is delayed, when the NR secondary cell accessed by the electronic terminal is released; and controlling the electronic terminal to continue to display the 5G icon in response to that the electronic terminal can currently access the NR secondary cell;

wherein the detecting whether the electronic terminal can currently access the NR secondary cell comprises:

detecting whether a current LTE primary cell supports the dual connections, when it is detected that an LTE primary cell where the electronic terminal is located is changed within the first preset time period;

detecting, according to a Radio Resource Control (RRC) state of the current LTE primary cell, whether the electronic terminal can currently access the NR secondary cell if the dual connections are supported; and determining that the electronic terminal cannot currently access the NR secondary cell if the dual connections are not supported.

8. The non-transitory computer-readable storage medium of claim 7, wherein the detecting, according to the RRC state of the current LTE primary cell comprises:

detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

9. The non-transitory computer-readable storage medium of claim 7, wherein the detecting whether the electronic terminal can currently access the NR secondary cell comprises:

detecting an RRC state of an LTE primary cell when it is detected that the LTE primary cell where the electronic terminal is located is not changed within the first preset time period;
determining that the electronic terminal can currently access the NR secondary cell, when the RRC state of the LTE primary cell is in a connection state; and
detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

10. The non-transitory computer-readable storage medium of claim 7, wherein the instructions are loaded by the processor to further perform steps of:
setting a bearer database, and updating, in real time, a bearer number in the bearer database according to a number of at least one type of at least one cell which is currently accessed by the electronic device; and
setting a cell database, and update, in real time, cell information in the cell database according to at least one cell where the electronic terminal is currently located.

11. The non-transitory computer-readable storage medium of claim 7, wherein the instructions are loaded by the processor to further perform steps of:
controlling the electronic terminal to display a 4G icon in response to that the electronic terminal cannot access the NR secondary cell.

12. The non-transitory computer-readable storage medium of claim 7, wherein the controlling the electronic terminal to continue to display the 5G icon comprises:
controlling the electronic terminal to display the 5G icon, when a frequency band of the NR secondary cell which the electronic terminal can currently access belongs to a Sub6 frequency band; and
controlling the electronic terminal to display a 5G Ultra Wideband (UWB) icon, when the frequency band of the NR secondary cell which the electronic terminal can currently access belongs to a millimeter wave frequency band.

13. An electronic terminal, comprising a processor and a memory, wherein the processor is electrically connected to the memory, the memory is configured to store instructions and data, and the instructions are loaded by the processor to perform steps of:
controlling the electronic terminal to display a 5G icon, after the electronic terminal establishes dual connections with a Long Term Evolution (LTE) network and a New Radio (NR) network;
detecting whether the electronic terminal can currently access an NR secondary cell after a first preset time period is delayed, when the NR secondary cell accessed by the electronic terminal is released; and
controlling the electronic terminal to continue to display the 5G icon in response to that the electronic terminal can currently access the NR secondary cell;
wherein the detecting whether the electronic terminal can currently access the NR secondary cell comprises:
detecting an RRC state of an LTE primary cell when it is detected that the LTE primary cell where the electronic terminal is located is not changed within the first preset time period;
determining that the electronic terminal can currently access the NR secondary cell, when the RRC state of the LTE primary cell is in a connection state; and
detecting whether information of the LTE primary cell and information of the NR secondary cell are stored in a preset cell database, when the RRC state of the LTE primary cell is in an idle state; determining that the electronic terminal can currently access the NR secondary cell if yes; and determining that the electronic terminal cannot currently access the NR secondary cell if no.

14. The electronic terminal of claim 13, wherein the detecting whether the electronic terminal can currently access the NR secondary cell comprises:
detecting whether a current LTE primary cell supports the dual connections, when it is detected that an LTE primary cell where the electronic terminal is located is changed within the first preset time period;
detecting, according to a Radio Resource Control (RRC) state of the current LTE primary cell, whether the electronic terminal can currently access the NR secondary cell if the dual connections are supported; and
determining that the electronic terminal cannot currently access the NR secondary cell if the dual connections are not supported.

15. The electronic terminal of claim 14, wherein the detecting, according to the RRC state of the current LTE primary cell, whether the electronic terminal can currently access the NR secondary cell comprises:
detecting whether a bearer number in a preset bearer database is 2 after a second preset time period is delayed, when the RRC state of the current LTE primary cell is in a connection state; determining that the electronic terminal can currently access the NR secondary cell if yes; and determining that the electronic terminal cannot currently access the NR secondary cell if no; and
detecting, within a third preset time period, whether the current LTE primary cell has an NR neighbor cell which meets a preset condition, when the RRC state of the current LTE primary cell is in an idle state; determining that the electronic terminal can currently access the NR secondary cell if yes; and determining that the electronic terminal cannot currently access the NR secondary cell if no.

16. The electronic terminal of claim 13, wherein the instructions are loaded by the processor to further perform steps of:
setting a bearer database, and updating, in real time, a bearer number in the bearer database according to a number of at least one type of at least one cell which is currently accessed by the electronic device; and
setting a cell database, and update, in real time, cell information in the cell database according to at least one cell where the electronic terminal is currently located.

17. The electronic terminal of claim 13, wherein the controlling the electronic terminal to continue to display the 5G icon comprises:
controlling the electronic terminal to display the 5G icon, when a frequency band of the NR secondary cell which the electronic terminal can currently access belongs to a Sub6 frequency band; and
controlling the electronic terminal to display a 5G Ultra Wideband (UWB) icon, when the frequency band of the NR secondary cell which the electronic terminal can currently access belongs to a millimeter wave frequency band.

\* \* \* \* \*